United States Patent [19]

Friedman

[11] 4,203,892
[45] May 20, 1980

[54] METHOD OF PROTECTING PROTEINS FOR ANIMAL FEED

[75] Inventor: Mendel Friedman, Moraga, Calif.

[73] Assignee: The United States of America as represented by the Secretary of Agriculture, Washington, D.C.

[21] Appl. No.: 897,083

[22] Filed: Apr. 17, 1978

[51] Int. Cl.² .......................... A23K 1/00; C08H 1/00
[52] U.S. Cl. .......................... 260/112 R; 260/112.5 R; 260/119; 426/656
[58] Field of Search ..................... 260/112 R, 112.5 R, 260/119; 426/656

[56] References Cited

U.S. PATENT DOCUMENTS

| | | | |
|---|---|---|---|
| 3,111,416 | 11/1963 | Gaver et al. | 260/119 |
| 3,285,691 | 11/1966 | Koenig | 260/112 R |
| 3,619,200 | 11/1971 | Ferguson et al. | 426/656 |
| 3,711,290 | 1/1973 | Miller | 260/112 R |
| 3,712,865 | 1/1973 | Evans et al. | 260/119 |
| 3,720,765 | 3/1973 | Miller | 260/112 R |
| 3,798,208 | 3/1974 | Miller | 260/119 |
| 3,806,417 | 4/1974 | Beaucamp et al. | 260/112 R |
| 3,825,525 | 7/1974 | Mullan et al. | 260/112 R |

OTHER PUBLICATIONS

Friedman et al., *Protein Crosslinking*, Plenum Press, N.Y. 11/23/77, pp. 545–558.

*Primary Examiner*—Walter C. Danison
*Attorney, Agent, or Firm*—M. Howard Silverstein; David G. McConnell; Theodore J. Leitereg

[57] ABSTRACT

Proteinaceous feed material is contacted with certain compounds to render it more suitable for ruminant animals. The so-treated proteinaceous material is resistant to degradation in the rumen of the animals but is readily degraded and digested in the intestines thereof.

7 Claims, No Drawings

METHOD OF PROTECTING PROTEINS FOR ANIMAL FEED

BACKGROUND OF THE INVENTION

1. Field of the Invention

This invention relates to and has among its objects the provision of novel compositions useful as feed for ruminant animals and novel methods for preparing the same. Further objects of the invention will be evident from the following description wherein parts and percentages are by weight unless specified otherwise.

2. Description of the Prior Art

The digestion of nitrogenous compounds by ruminant animals is a complex process involving two interrelated processes. In the first process microbial digestion occurs in the reticulum, rumen, and omasum; in the second, hydrolytic or enzymatic digestion occurs in the abomasum and intestines.

Most of the nitrogenous material ingested by ruminants fed natural feed consists of proteins. Although it is unusual for dietary protein to be completely degraded upon entering the rumen, these proteins are extensively hydrolyzed by rumen bacteria to their constituent amino acids, which are then rapidly deaminated to produce ammonia. This process wastes valuable amino acids required for growth because the so-produced ammonia, although used by microbes in part to resynthesize protein assimilated by the animal, is partly excreted. It is, therefore, desirable to reduce ruminal protein degradation and thereby increase the net absorption of amino acids in the intestines, which results in more efficient use of the proteinaceous feed material. Consequently, body growth, meat, milk, and animal hair production, and the like, requiring the synthesis of proteins from amino acids, are enhanced.

Methods are known in the art for protecting proteinaceous feed from breakdown within the rumen and increasing the net absorption of amino acids in the intestines. Heat treatment of the proteinaceous feed is effective, but substantial impairment of overall digestibility and loss of essential amino acids make the use of heat unsatisfactory. Similar difficulties have been encountered when the feed is chemically modified.

A particular process for protecting proteinaceous feed materials for ruminant animals is disclosed in U.S. Pat. No. 3,619,200 by Ferguson et al. (Ferguson). In the patented method a proteinaceous feed material is coated with a member selected from the group consisting of polymers of basic amino acrylate and methacrylate, basic vinyl monomers, and copolymers thereof.

SUMMARY OF THE INVENTION

I have discovered that excellent protection of proteinaceous ruminant feed can be obtained by a process wherein the feed is contacted with one of the following compounds:

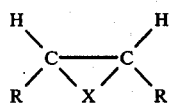  Group A.

wherein:

X is oxygen, sulfur, or nitrogen substituted with either hydrogen, alkyl, or aryl, and R is independently hydrogen, aryl, substituted aryl, lower alkyl containing 1–5 carbon atoms and containing at the alpha position either hydrogen, hydroxyl, chlorine, bromine, iodine, alkoxyl, alkenoxyl, and aryl.

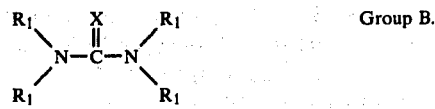  Group B.

wherein:

X is oxygen or sulfur, $R_1$ is independently hydrogen or lower alkyl containing 1–5 carbon atoms and containing at the alpha position hydroxyl, chlorine, bromine, iodine, alkoxyl, alkenoxyl, aryloxyl, substituted aryloxyl, aryl substituted alkoxyl and alkenoxyl, and wherein at least one $R_1$ is not hydrogen.

Feed treated in accordance with the method of the invention is, therefore, a novel composition comprising proteinaceous material and one or more of the above compounds.

A primary advantage of the invention is that proteinaceous ruminant feed can be protected from ruminal degradation without impairment of its degradation and digestion later in the intestines. Thus, animals fed the material of the invention exhibit increased weight gain and increased production of milk, animal hair, such as wool, etc., and the like. A particular advantage of the method of the invention is that it produces results that are more consistent than those obtained with known methods. The prior art processes at times yield a much lower level of protection than expected or result in no protection at all.

DESCRIPTION OF THE PREFERRED EMBODIMENTS

As mentioned above, the benefits of the invention can be obtained by contacting the feed material with any of the compounds selected from either Group A or B. Examples, by way of illustration and not limitation, of compounds that may be used in the process of the invention are:

Group A. Oxacyclopropanes such as oxacyclopropane (ethylene oxide), methyloxacyclopropane (propylene oxide), 1,2-dimethyloxacyclopropane (2,3-butylene oxide), ethyloxacyclopropane (1,2-butylene oxide), hydroxymethyloxacyclopropane (glycidol), 1,2-dihydroxymethyloxacyclopropane, chloromethyloxacyclopropane (epichlorohydrin), bromomethyloxacyclopropane (epibromohydrin), iodomethyloxacyclopropane, phenyloxacyclopropane (styrene oxide), 2-propenoxymethyloxacyclopropane (allylglycidyl ether), methoxymethyloxacyclopropane, and the like.

Thiacyclopropanes such as thiacyclopropane, methylthiacyclopropane, 1,2-dimethylthiacyclopropane, ethylthiacyclopropane, hydroxymethylthiacyclopropane, 1,2-dihydroxymethylthiacyclopropane, chloromethylthiacyclopropane, bromomethylthiacyclopropane, iodomethylthiacyclopropane, phenylthiacyclopropane, 2-propenoxymethylthiacyclopropane, methoxymethylthiacyclopropane, and the like.

Azacyclopropanes such as azacyclopropane, methylazacyclopropane, 1,2-dimethylazacyclopropane, ethylazacyclopropane, hydroxymethylazacyclopropane, 1,2-dihydroxymethylazacyclopropane, chloromethylazacyclopropane, bromomethylazacyclopropane, iodomethylazacyclopropane, phenylazacyclopropane, N-methyl hydroxymethylazacyclopropane, N-methyl chloromethylazacyclopropane, N-methyl bromomethylazacyclopropane, N-methyl phenylazacyclopropane, and the like.

Group B. Ureas such as hydroxymethylurea (N-methylol urea), di(hydroxymethyl)urea, 1-hydroxyethylurea, di-(1-hydroxyethyl)urea, chloromethylurea, di(chloromethyl)urea, bromomethylurea, di(bromomethyl)urea, iodomethylurea, di(iodomethyl)urea, methoxymethylurea, di(methoxymethyl)urea, 2-propenoxymethylurea, di(2-propenoxymethyl)urea, phenoxymethylurea, di(phenoxymethyl)urea, phenylmethoxymethylurea, di(phenylmethoxymethyl)urea.

Ureylenes such as hydroxymethylureylene (di-N,N'-methylol urea), 1-hydroxyethylureylene, chloromethylureylene, bromomethylureylene, iodomethylureylene, methoxymethylureylene, 2-propenoxymethylureylene, phenoxymethylureylene, phenylmethoxymethylureylene.

In preparing the novel feed compositions of the invention, proteinaceous feed material is contacted with any of the above agents in Group A or B. Generally, contact between the feed material and the instant agent is maintained for a period sufficient to yield a protected feed, i.e., for about 0.2–72 hours. The temperature during this period is about 0°–50° C. In a preferred embodiment a reaction medium such as water is employed in the proportion of 5–100 parts of water per part of proteinaceous material. The amount of agent used should be sufficient to yield a protected feed and is generally about 0.1–40 parts per part of feed material. In most cases contact between the agent and the feed is facilitated by mixing. The pH of the mixture is adjusted to about 8–10, the usual practice being incorporation of a suitable buffer into the mixture of feed and agent. The modified feed composition can be separated from excess agent by conventional techniques such as pressing, dialysis, lyophilization, and the like. It should be noted that the duration and temperature of contact and the amount of agent employed are dependent on the nature of the protein to be protected and the nature of the protecting agent.

The invention can be applied to all types of proteinaceous feed materials including plant and animal material such as meat, fish meals; caseins or yeast; meat, fish, poultry, and dairy by-products, fermentation wastes; chaffs, silage, meals, pellets, concentrates, or the like from grains such as corn, wheat, etc., nuts, beans, and other protein-rich plants; and purified proteins isolated from the aforementioned materials. In addition to natural proteinaceous materials, the present method is applicable to amino acids and peptides, either synthetic or derived from proteins.

The compounds of Group A and B are known materials and can be readily obtained or synthesized.

The protection of the feed material, treated in accordance with my process, against ruminal degradation is believed to result from a chemical combination between the proteinaceous feed and the agent. The chemcially-modified protein resists attack by ruminal fluids but is readily degraded by intestinal digestive liquids. It is not meant, however, to limit my invention to any particular mechanism since others are possible. Regardless of the theory involved, I have established that proteinaceous feed material can be protected against ruminal degradation by the above-mentioned method.

EXAMPLES

The invention is further demonstrated by the following illustrative examples.

EXAMPLE 1

Feed Material Prepared from Casein and Compounds of Group A

Oxacyclopropane (ethylene oxide, 60 ml) was added to 60 g of casein in 500 ml of water and 150 ml of 0.05 M (borax) borate buffer at pH 9.1. The reaction mixture was stirred for 48 hours, dialyzed against distilled water, and lyophilized to give 62 g of product.

The above procedure was repeated using, in place of oxacyclopropane, methyloxacyclopropane (propylene oxide), hydroxymethyloxacyclopropane (glycidol), 2-propenoxymethyloxacyclopropane (allyl glycidyl ether), phenyloxacyclopropane (styrene oxide), chloromethyloxacyclopropane (epichlorohydrin), and bromomethyloxacyclopropane (epibromohydrin). The duration of contact was varied from 24 to 72 hours.

Untreated casein was used as a control.

The percentage of protein in the products was determined by Kjeldahl analysis on the air-dried material.

In vitro incubation tests to determine the ruminal degradation rate (RDR) were conducted by measuring the amount of ammonia released by the products of the invention in the following procedure:

Samples containing about 180 mg treated feed material were weighed into 50 ml polyethylene centrifuge tubes. Five ml of McDougall's buffer (Biochem. J., Vol. 43, pages 99–109 (1948)) were added to each sample. The mixtures were allowed to soak overnight at 40° C. Then, the tubes were put in a water bath at 39° C., and ten ml of Incubation Mixture (IM) were added to each tube; tubes were radidly capped with stoppers equipped with Bunsen valves and were incubated for 2 hours at 39° C. in a shaker water bath. Digestion was stopped by adding 1 ml of 50% trichloroacetic acid (TCA) to each tube.

The Incubation Mixture contained 50% v/v (volume to volume) McDougall's buffer, 50% v/v strained rumen liquor (SRL), 1% w/v (weight to volume) maltose, 1.5 mM (millimoles) dithithreitol (DTT). In most experiments 1.5 mM hydrazine sulfate (HS) was also added to inhibit microbial removal of ammonia ($NH_3$) and amino acids released during protein degradation. Maltose and HS were dissolved in an appropriate amount of McDougall's buffer that had been freshly saturated with carbon dioxide ($CO_2$) gas. This mixture was warmed to 39° C. with continued $CO_2$ gassing until the SRL was brought to the laboratory. Just before adding the appropriate volume of SRL to the tubes, the DTT was weighed and dissolved in the warmed gassed McDougall's solution. SRL was mixed with the buffer and the Incubation Mixture was rapidly dispensed into the incubation tubes to a final concentration of: 15 ml total (10 ml buffer+5 ml SRL), 1 mM DTT and 1 mM HS; 0.67% w/v maltose (0.10 g maltose/tube).

In each incubation experiment two blank tubes, two tubes with each preparation, and two special blank tubes which were stopped with exactly 1 ml of 50% w/v TCA solution containing 32 mM leucine (amino acid standard) and 32 mM $NH_3$ (ammonia standard added as ammonium sulfate) were employed. This gave added leucine and ammonia concentrations of 2.0 μM/ml. Ammonia and corrected amino acid (non-$NH_3$ ninhydrin positive material) concentrations were determined using a Technicon Auto Analyzer System. Net NH3 and net amino acid release were calculated by subtracting concentrations of NH3 and amino acids in blank tubes from those in tubes receiving casein preparations.

Net release values were adjusted according to recoveries of added NH3 and leucine in the special blank tubes. Finally, ruminal degradation rates (RDR) were obtained from the sum of adjusted net NH3 plus amino acid release in μM/SRL; the lower the RDR, the better protected the feed material against ruminal degradation.

The amount of NH3 released was ascertained by an adaptation to the Auto Analyzer of the phenolformaldehyde method for determining NH3 in whole blood (*Clin. Chim. Acta*, Vol. 17, pages 297–304 (1967)). Sodium nitroprusside was added to the phenol reagent to enhance color development. The reaction temperature was 95° C. rather than 37° C.

Amino acid release was determined by a procedure adapted from the "Air-Stable Ninhydrin" method of Technicon (*Technicon Research Bulletin* No. 20 (1968)). No hydridantin was added to the ninhydrin reagent in this procedure, so the ninhydrin reagent was stable at room temperature in air. Hydrindantin was formed when ninhydrin mixed with the 0.002 M hydrazine in the analytical system. The principle of this procedure was to first measure the NH3 concentration (using phenol-hypochlorite method), then, the relative ninhydrin-color yield of NH3 and leucine standards, and, finally, the total ninhydrin-positive material ("gross amino acid concentration") in the ruminal in vitro samples. The contribution of NH3 to the total ninhydrin color was determined and the corrected amino acid concentration was calculated by difference.

The extent of reaction between the proteinaceous feed and the above compounds was determined by the "Ninhydrin Procedure for Modified Proteins." The procedure was adapted from a procedure described in *J. Agric. Food Chem.*, Vol. 23, pages 194–196 (1975), in *Biorganic Chem.*, Vol. 3, pages 267–280 (1974), and in *Anal. Biochem.*, Vol. 54, pages 333–345 (1973).

Samples (3.0 mg) of the modified products were weighed into 16×100 mm test tubes. To each sample was added 3.8 ml of dimethylsulfoxide (DMSO) in water (4:1, v/v) and 0.2 ml of 0.125 M sodium metabisulfite. Each sample was mixed in a vortex mixer for 30 sec. Then, 1.2 ml of 3% ninhydrin (3 g ninhydrin in 25 ml of 4 N sodium acetate buffer at pH 5.5, 50 ml of DMSO, and 25 ml of water; mixed with 13 mg of hydrazine sulfate in 10 ml of water at ratio of 5 parts ninhydrin solution per part of hydrazine sulfate solution) was added to each tube and the contents were mixed briefly with the vortex. The tubes were capped, heated in boiling water for 30 min., and then cooled rapidly by partial immersion in cold water. The tubes were centrifuged for 5 min. at 900–1000 xg. A 1-ml aliquot was transferred from each tube to cuvettes (10 mm path length) and was diluted with 5 ml of the above DMSO solution. The contents were mixed with the vortex and the optical density (absorbance) of the solution at 580 nm (nanometers) was read in a spectrophotometer. The extent of chemical modification of amino groups (percent reaction) was calculated from the decrease in the above reading at 580 nm compared to the control value.

The results are summarized in the following table.

| Treatment | | Protein (%) | RDR | Reaction of Casein with agent |
|---|---|---|---|---|
| Agent | Hours | (N × 6.25) | (%) | (%) |
| Epibromohydrin | 72 | 70.75 | 3.7 | 95.5 |
| | 24 | 74.76 | 5.1 | 91.7 |
| Epichlorohydrin | 26 | 70.79 | 8.1 | 95.8 |
| Styrene oxide | 48 | 67.91 | 13.4 | 60.9 |
| Allyl glycidyl ether | 48 | 70.50 | 45.2 | 86.5 |
| Glycidol | 24 | 77.83 | 60.0 | 94.1 |
| Propylene oxide | 48 | 75.53 | 65.9 | 85.7 |
| Ethylene oxide | 48 | 78.62 | 62.4 | 94.3 |
| Control (untreated casein) | — | 87.3 | 100.0 | 0.0 |

EXAMPLE 2

Feed Material Prepared from Casein and Compounds of Group B

A 4-g portion of casein was mixed with 40 ml of 0.5 M (borax) borate buffer (pH 9.2). Dilute aqueous sodium hydroxide was added to adjust the pH to 9.0. Then, 2.14 g of hydroxymethylureylene was added to the mixture, which was stirred for 24 hours. The product was then treated and analyzed as described above in Example 1.

| Treatment | | RDR | Reaction of Casein |
|---|---|---|---|
| Agent | Hours | (%) | with agent (%) |
| Hydroxymethylureylene | 24 | 22.3 | 54.0 |
| Hydroxymethylurea | 24 | 23.4 | 57.3 |
| Control (casein) | — | 100.0 | 0.0 |

Having thus described my invention, I claim:

1. A method for producing modified proteinaceous feed materials for ruminant animals, which comprises contacting a proteinaceous feed material with a compound of the structure-

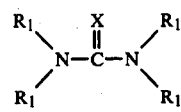

wherein:

X is oxygen or sulfur $R_1$ is independently hydrogen or lower alkyl containing 1–5 carbon atoms and containing at the alpha position hydroxyl, chlorine, bromine, iodine, alkoxyl, alkenoxyl, aryloxyl, substituted aryloxyl, and aryl-substituted alkoxyl and alkenoxyl, and wherein at least one $R_1$ is not hydrogen, for a time and in an amount sufficient to chemically modify the proteinaceous material to protect it against microbial degradation in the rumen of the animal but render it capable of degradation and digestion in the intestines of the animal.

2. The method of claim 1 wherein the time of contact is about 0.2 to 72 hours.

3. The method of claim 1 wherein the amount of compound is about 0.1–40 parts per part of proteinaceous feed material.

4. The method of claim 1 wherein the compound is a urea.

5. The method of claim 1 wherein the compound is a ureylene.

6. The method of claim 1 wherein the compound is selected from the group consisting of hydroxymethylurea, di(hydroxymethyl)urea, 1-hydroxyethylurea, di-(1-hydroxyethyl)urea, chloromethylurea, di(chloromethyl)urea, bromomethylurea, di(bromomethyl)urea, iodomethylurea, di(iodomethyl)urea, methoxymethylurea, di(methoxymethyl)urea, 2-propenoxymethylurea, di(2-propenoxymethyl)urea, phenoxymethylurea, di(phenoxymethyl)urea, phenylmethoxymethylurea, di(phenylmethoxymethyl)urea, hydroxymethylureylene, 1-hydroxyethylureylene, chloromethylureylene, bromomethylureylene, iodomethylureylene, methoxymethylureylene, 2-propenoxymethylureylene, phenoxymethylureylene, and phenylmethoxymethylureylene.

7. A modified proteinaceous feed material for ruminant animals capable of degradation and digestion in the intestines of the animal but protected against degradation in the rumen of the animal comprising the chemically combined product of a proteinaceous feed material and a compound of the structure

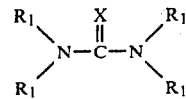

wherein:

X is oxygen or sulfur $R_1$ is independently hydrogen or lower alkyl containing 1–5 carbon atoms and containing at the alpha position hydroxyl, chlorine, bromine, iodine, alkoxyl, alkenoxyl, aryloxyl, substituted aryloxyl, and aryl-substituted alkoxyl and alkenoxyl, and wherein at least one $R_1$ is not hydrogen.

* * * * *